July 6, 1937.  H. E. BUTLER  2,086,378
KEY HOLDER
Filed March 12, 1935
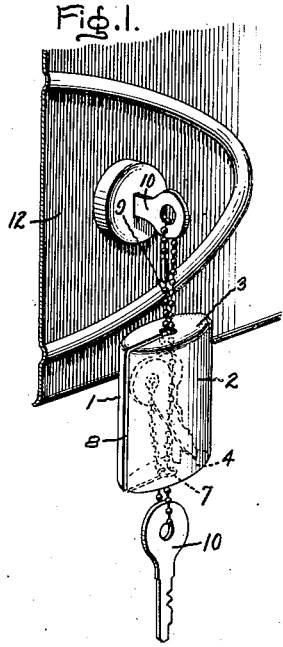
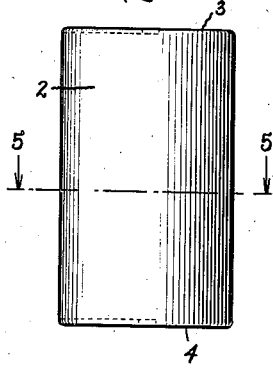
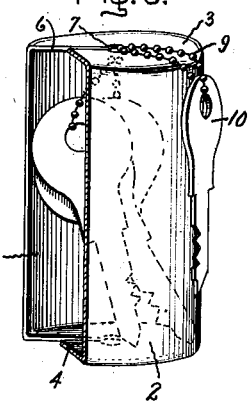
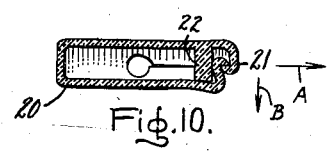
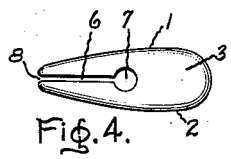
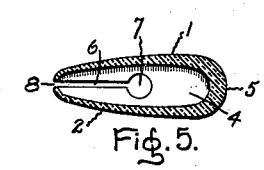
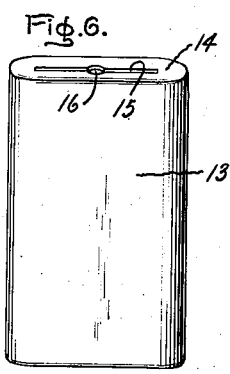
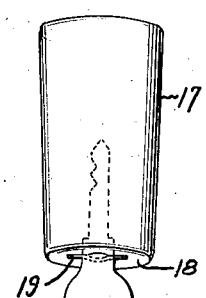
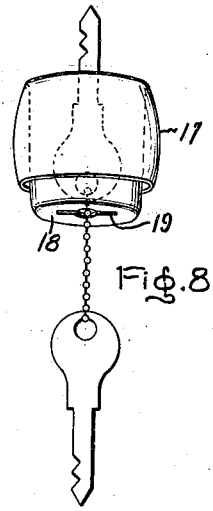
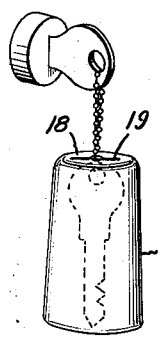
Inventor
Henry E. Butler,
by Alfred E. Bobst
His Attorney.

Patented July 6, 1937

2,086,378

UNITED STATES PATENT OFFICE 2,086,378

KEY HOLDER

Henry E. Butler, Scotia, N. Y.

Application March 12, 1935, Serial No. 10,649

4 Claims. (Cl. 150—40)

The present invention relates to key holders and especially to key holders for automobile keys although it is not limited thereto.

It is now the more common practice to carry the several keys for an automobile on a flexible chain connected together at its ends to form a ring. When the key to the ignition lock for the automobile is in place in the lock, the remaining keys hang down and rattle against the instrument board when the automobile is running, a thing which is annoying and which also may mar the finish of the instrument board. One object of my invention is to provide a key holder which will hold the keys other than the one in the ignition lock and keep them from rattling or from marring the finish of the instrument board.

A further object of my invention is to provide a key holder which is simple in structure, convenient to use, and capable of being manufactured at low cost.

Other objects of my invention and the advantages thereof will be pointed out more fully in the following specification, and for a consideration of what I believe to be novel and my invention attention is directed to the following specification and the claims appended thereto.

In the drawing, Fig. 1 is a perspective view of a key holder embodying my invention, a key from the holder being in the ignition lock of an automobile; Fig. 2 is a side view of the key holder shown in Fig. 1; Fig. 3 is a side view of the container, a portion being in section; Fig. 4 is a top plan view of the holder; Fig. 5 is a section taken on line 5—5, Fig. 2; Fig. 6 is a side view of a modified form of key holder, Figs. 7, 8 and 9 are views of another modification, and Fig. 10 is a sectional view of another modification.

According to my invention, I form the key holder from a non-metallic flexible material such as rubber, for example, the same being in the form of a pocket having an opening in one or both ends, preferably both ends, through which a key may be inserted or withdrawn and through which a portion of a chain may extend.

In the form of the invention shown in Figs. 1 to 5 inclusive, the key holder comprises a pocket having side walls 1 and 2 and end walls 3 and 4. The side walls 1 and 2 are tapered in section as is best shown in Fig. 5, the two walls merging into each other as is shown at 5 to form a sort of hinge, the walls being thickest at the hinge. The edges of the side walls opposite the hinge are not connected to each other and the end walls 3 and 4 are split part way through as is indicated at 6, the splits terminating in a round opening 7 located at about the center of the end walls. This forms a longitudinally extending mouth 8 which can be opened sufficiently to permit of keys being inserted into the holder. Preferably the holder is formed of rubber of suitable stiffness so it is self supporting and not too flexible and the hinge portion is made sufficiently thick to give the desired resistance to opening of the mouth. The holder may be formed with advantage as an integral structure, being molded in a single piece.

In Figs. 1 and 3, 9 indicates a key chain and 10 indicates keys thereon. In Fig. 1, the one key is shown as being in the ignition lock of an automobile, other keys being in the pocket while still another key hangs down below the holder. The openings 7 are of a size to permit of the passage of the key chain as shown in Figs. 1 and 3. When one key is in the ignition lock, the holder hangs on the chain and stands in a position to strike the instrument board 12 of the automobile thus protecting it from contact with the other keys. Thus rattling of the keys against the instrument board is prevented. Also rattling of the keys against each other is prevented.

One convenient way to use the holder is to have the ignition key projecting from one end of the holder, the door key projecting from the other end of the holder, and the other keys which may comprise the spare tire key, a trunk key and the like in the holder. This makes the two principal keys and the two keys most used easy to find and hence makes the holder handy to use. By compressing the ends of the holder, the mouth of the holder may be forced open for the insertion and the removal of a key or keys. The material of the holder is stiff enough, preferably, so that it holds its shape and retains the keys.

In Fig. 6 is shown a form of my invention wherein the longitudinally extending slot or mouth is omitted, the side walls 13 being continuous. The end wall 14 is provided with a transverse slot 15 having an enlarged chain opening 16 at its central portion. The end opposite end 14 may be similar to end 14, or the slot may be omitted. Or, if found desirable this end may be open. With this form of the invention, all the keys with the exception of the one being used may be in the pocket, the chain extending out through opening 16 and holding the key being used. If desired, the form of the invention shown in Fig. 6 may be formed from a material somewhat lighter and more flexible than that used for the construction of Figs. 1 to 5.

In Figs. 7, 8 and 9 is shown a form of the invention wherein the holder is formed from fairly flexible material. It comprises the continuous side walls 17 and the end wall 18 provided with the slot 19 through which a key may be inserted or withdrawn. The other end of the holder is open. This form of holder is adapted more particularly for use with two keys although more than two may be used with it. A key may be inserted into it after the manner shown in Fig. 7 and when one key is in a lock the other key is in the holder as shown in Fig. 9. When the key in the holder is to be used, the holder is turned inside out as is indicated in Fig. 8, being thus reversed so as to uncover the one key and cover the other key.

In Fig. 10 is illustrated a modification similar to Figs. 1 to 5 inclusive, differing therefrom primarily in that means are provided for locking together the edges of the longitudinally extending slot in the side wall. In the present instance, the locking means is shown as comprising projections or beads 21 formed on wall 20 along the slot edges which interlock with each other. The projections or beads may be integral with the side wall and they may extend throughout the length of the side wall or they may be somewhat shorter as found desirable. Also, they may be shaped as shown so as to overlap and firmly engage each other.

To more firmly maintain the interlocking edges together, I may provide a holding means which serves, when the edges are overlapped, to press them together. In the present instance, this holding means comprises a wall 22 which projects inwardly from one side of the holder toward the other side and stands in spaced relation to the adjacent projection or bead 21. Wall 22 may extend throughout the length of the holder or it may be shorter in length, and it may be one continuous wall or it may be in the form of a series of projections. It is located sufficiently close to the projections or beads 21 that when they are interlocked it serves to press them together in the direction of the arrow A, that is in a cross-wise direction. Also, it is preferably made of a depth somewhat greater than the depth of the holder so that it tends to force the projections together in the direction of the arrow B, that is, in a transverse direction. Because of the resiliency of the walls, the interlocking edges can be readily pushed into locking engagement with each other. The resiliency of the walls tends to hold the edges together and this is augmented by the holding means 22. The force exerted by wall 22 in the direction of both arrows A and B may be varied by the spacing of wall 22 from the adjacent projection 21 and by varying its depth.

A construction as shown in Fig. 10 may be made from relatively soft rubber, if desired, since the locking means maintains the holder closed so the keys cannot come out.

Viewed from another aspect, the structures shown in Figs. 1 to 5 and in Fig. 10, instead of being considered as comprising two side walls hinged together along one edge, may be considered as comprising continuous side walls provided with a longitudinally extending slot which at its edges communicates with the slots in the end walls.

While I have illustrated the arrangements in Figs. 1 to 5 and in Fig. 10 as being provided with end walls at both ends, one end wall may be omitted if found desirable.

By my invention, I provide a key holder which is simple in structure, convenient in use and capable of being manufactured at low cost. It is especially useful in connection with a key ring formed from a flexible chain.

While I have described my invention as relating to a key holder, and this is the use for it I now contemplate, it is to be understood that the invention is not limited necessarily to this use.

What I claim as new and desire to secure by Letters Patent of the United States is:—

1. A key holder for keys carried by a flexible chain comprising side and end walls of flexible self sustaining material forming a pocket, one end wall having an opening therein for the passage of a loop in a key chain, and such end wall and one side wall having a continuous slot extending from said one end wall opening across the end and the side to form an opening through which keys carried on a flexible chain may be inserted and removed from the key holder, the other side wall being continuous and sufficiently rigid to form a yielding hinge which serves to normally yieldingly maintain the slot in the one side wall closed.

2. A key holder for keys carried by a flexible chain comprising side and end walls of flexible self sustaining material forming a pocket, one end wall having an opening therein for the passage of a loop in a key chain, and such end wall and one side wall having a continuous slot extending from said one end wall opening across the end and the side to form an opening through which keys carried on a flexible chain may be inserted and removed from the key holder, the edges of the slot in the side wall having overlapping interlocking engagement with each other to hold the slot closed, the other side wall being continuous and serving as a hinge for the holder.

3. A key holder for keys carried by a flexible chain comprising side and end walls of flexible material forming a pocket, one end wall having an opening therein for the passage of a loop in a key chain, and such end wall and the side wall having a continuous slot extending from said one end wall opening across the end and the side to form an opening through which keys carried on a flexible chain may be inserted and removed from the key holder, interlocking beads on the edges of the slot in the side wall to hold the slot closed, and a projecting wall which holds the side walls apart to maintain the beads in interlocking engagement.

4. A key holder for keys carried by a flexible chain comprising side and end walls of flexible self sustaining material forming a pocket, each end wall having an opening therein for the passage of a loop in a key chain, and such end walls and one side wall having a continuous slot extending from said openings across the ends and the side to form an opening through which keys carried on a flexible chain may be inserted and removed from the key holder, the other side wall being continuous and sufficiently rigid to form a yielding hinge which serves to normally yieldingly maintain the slot in the side wall closed.

HENRY E. BUTLER.